UNITED STATES PATENT OFFICE.

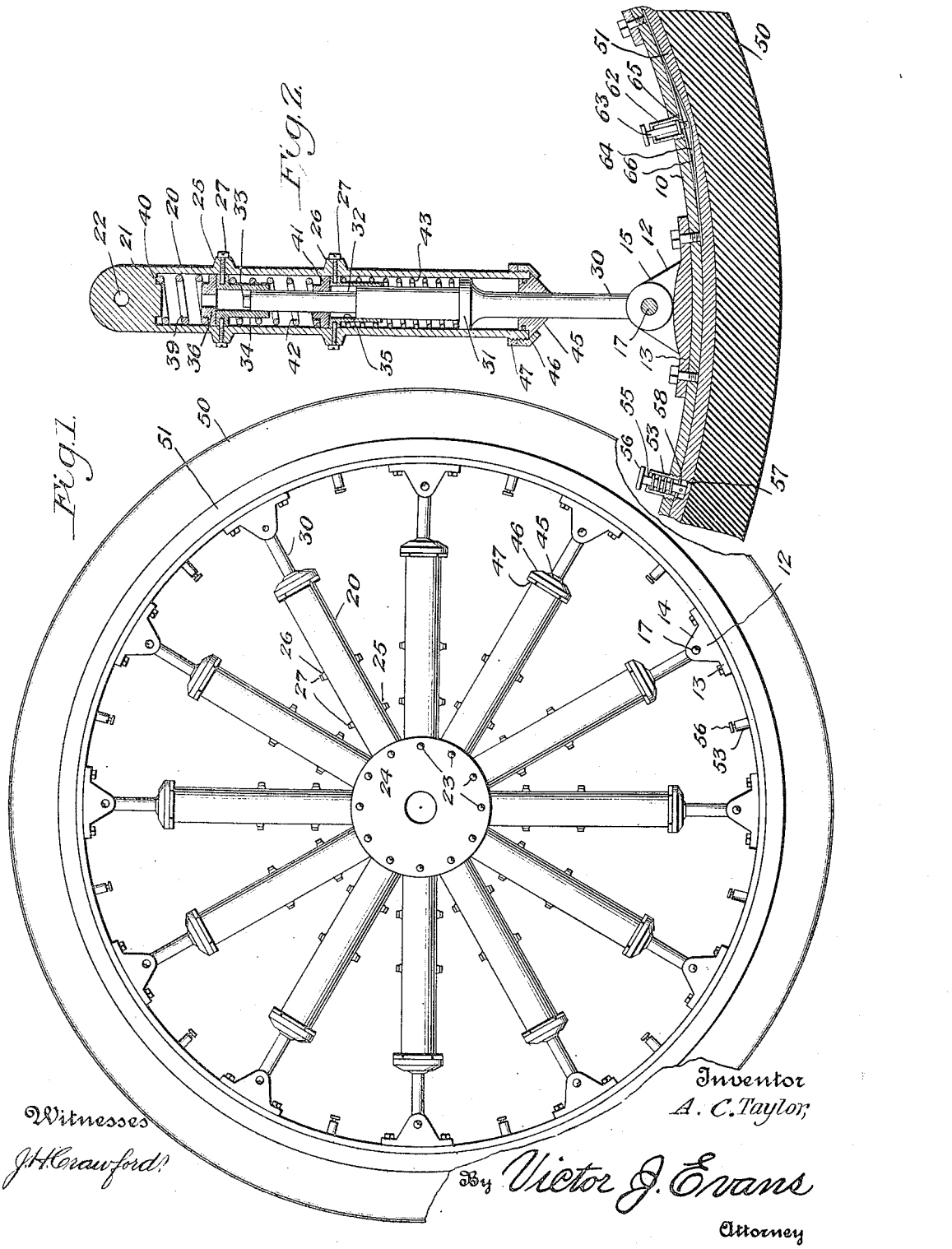

ACA COLUMBUS TAYLOR, OF KELLYVILLE, OKLAHOMA.

RESILIENT WHEEL.

1,416,078.　　　　　　Specification of Letters Patent.　　Patented May 16, 1922.

Application filed May 22, 1920. Serial No. 383,456.

*To all whom it may concern:*

Be it known that I, ACA COLUMBUS TAYLOR, citizen of the United States, residing at Kellyville, in the county of Creek and State of Oklahoma, have invented new and useful Improvements in Resilient Wheels, of which the following is a specification.

This invention relates to a resilient wheel, and one object is to provide a wheel which shall be capable of resisting all ordinary and usual strains, one which is designed for use with a solid tread, and one which will provide a maximum degree of resiliency without sacrificing any feature which would affect the durability of the structure.

A further object is to provide a wheel including a hub, a rim for mounting the tread or tire proper, spokes having pivotal connection with the rim, the spokes being slidably and resiliently mounted with reference to tubular elements connected with the hub and extending radially therefrom.

With the foregoing and other objects in view, the invention consists in the novel construction, combination, and arrangement of elements hereinafter described and claimed.

In the drawings, Figure 1 is a view of the wheel in side elevation, a portion being broken away, and Figure 2 is a view in longitudinal section and elevation showing one of the spokes and the elements directly associated therewith, also a portion of the rim structure (not claimed).

The rim of the wheel is designated 10, and has connected therewith on the inner side a plurality of brackets 12 having base portions 13 which are directly bolted to the rim. Ears 14 and 15 project from the base portion and are provided with apertures through which a pin 17 passes, for effecting pivotal connection with the spokes.

The spokes considered as a whole may be said to comprise tubular members having pivotal connection with the hub, and other members having pivotal connection with the rim, and operating within the tubular members, forming a telescoping connection, certain novel means described below being employed, permitting of the relative movement of the elements of the individual spokes, and cushioning such movement, in order to provide for the resiliency of the wheel.

The tubular member of the spoke is designated 20 and is provided with a closed end portion 21 having an aperture 22 therein, through which a pin 23 passes, this pin also passing through the elements of the hub 24. Annular enlargements 25 and 26 are formed on the tubular member 20, threaded pins or small bolts 27 passing through these annular enlargements, and retaining certain of the elements mentioned below in position.

For convenience the element 30 will be referred to herein as the spoke, this element having a flange 31, the diameter of which corresponds with the diameter of the bore of the tubular member 20. The spoke 30 is reduced at 32 and is provided with a reduced end portion 33.

Sleeves 34 and 35 are provided with flanges at one end, the flanged portions receiving the ends of the threaded pins or bolts 27, whereby the sleeves are retained in position. The bore of each sleeve corresponds with the bore of the spoke 30 at the point where that sleeve cooperates with the spoke, for forming a guiding element.

A washer 36 is apertured centrally, this aperture receiving the reduced end 33 of spoke 30, and the washer bears against the end of sleeve 34. The washer serves as a seat for one end of the spring 39, the opposite end bearing against the portion 40 at the end of the bore of element 20.

A washer 41 serves a similar purpose in connection with spring 42, the opposite end of spring 42 bearing against the flanged portion of sleeve 34. A third spring 43 surrounds spoke 30 and bears against the flange 31 and against the flange of sleeve 35.

In view of this construction, and the spacing of the shouldered portions of the spoke 30 with reference to washers 36 and 41, constituting spring seats, a particular and improved cushioning effect is secured. It will be noticed that the spring 43 is first placed under compression, and that subsequently springs 42 and 39 are placed under compression, the spring 39 acting only when the strain is more severe than usual. Resiliency is thus provided under different degrees of strain and under different conditions, as when there is a decided variation in the load carried by the vehicle.

A brass bushing 45 is located as shown, and is retained by an annular member 46 and a jamb nut 47.

The tread 50 may be of any suitable material, the ring 51 serving as a mounting member, and the whole being carried by the rim 10 of the wheel. The rim is provided with apertures at intervals, receiving the threaded ends of the tubular casings 53, each casing having an end portion, apertured for the accommodation of a pin 55 provided with a head 56. Openings 57 are formed in ring 51, these openings having an entrance portion whereby the pins 55 having each a transverse pin 58 extending therethrough may be inserted and given a quarter turn, for the purpose of locking the elements together. In the unlocking operation, the pins 55 are given a quarter turn in the reverse direction in order to permit of their withdrawal through the reduced entrance portion of the openings 57. The pins are under the control of springs.

Element 51 is provided with recesses of the form shown in the lower right hand portion of Figure 2. A tubular element 62 is threaded into rim 10 and receives the pin 63 having a flanged portion or washer thereon, this pin serving to press a leaf spring 64 into the aforesaid recess in element 51, thereby constituting an additional securing device. A transverse pin 65 passing through a slot in strip 66, is given a quarter turn for holding it in engaging position.

What is claimed is—

1. In a resilient wheel, a rim, spokes pivotally connected with the rim, a hub, tubular members pivotally connected with the hub, the spokes and tubular members having telescoping connection, sleeves rigidly mounted within each tubular member at spaced intervals, each spoke being provided with shoulders at spaced intervals and with a plurality of springs one of which is normally in engagement with one of the shoulders, means engaging one end of each of the remaining springs, the remaining shoulders of the spokes successively compressing the springs last named, by engagement with said means.

2. A resilient wheel comprising a rim, spokes pivotally connected with the rim, a hub, tubular members pivotally connected with the hub and cooperating with the spokes, said tubular members and spokes having telescoping connection, a plurality of sleeves rigidly mounted within each tubular member at spaced intervals, each sleeve including a portion spaced annularly from the wall of the tubular member, a spring surrounding each sleeve and surrounding the spoke, the sleeve forming a guiding element for the spoke, the tubular member being closed at one end, a spring located between said closed end and one of the sleeves, means placing the spring under compression by the extreme movement of the spoke toward the hub, and means whereby each of the other springs are placed under compression upon movement of the spokes radially of the hub under a strain exerted by a load of less weight.

In testimony whereof I affix my signature.

ACA COLUMBUS TAYLOR.